June 5, 1962     S. STEFANUTTI     3,037,721
VERTICAL TAKE OFF AND LANDING AIRCRAFT
Filed May 26, 1960     2 Sheets-Sheet 1
Fig. 1a
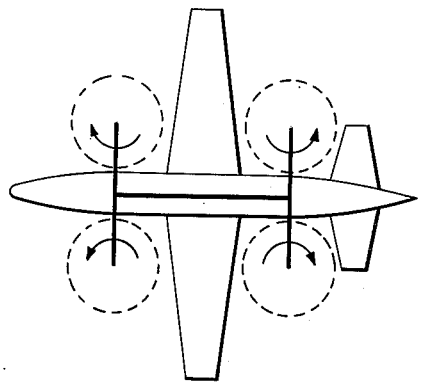
Fig. 2a
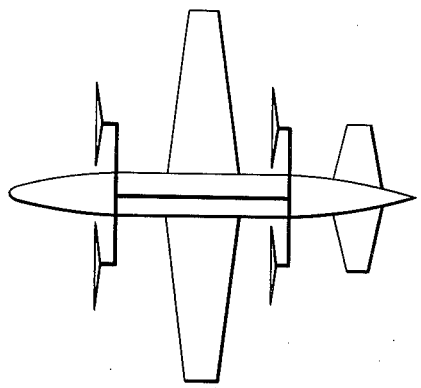
Fig. 1b
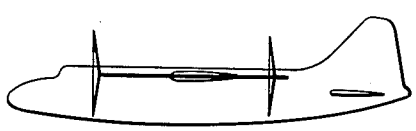
Fig. 2b
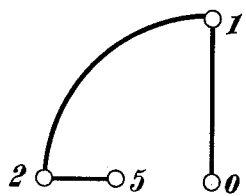
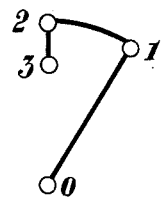
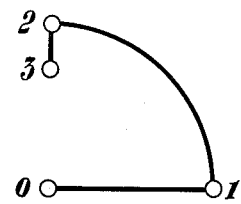
Fig. 4a     Fig. 4b     Fig. 4c
GIORGIO STEFANUTTI
INVENTOR.
BY Wenderth, Lind and Ponack
ATTORNEYS June 5, 1962 S. STEFANUTTI 3,037,721
VERTICAL TAKE OFF AND LANDING AIRCRAFT
Filed May 26, 1960 2 Sheets-Sheet 2
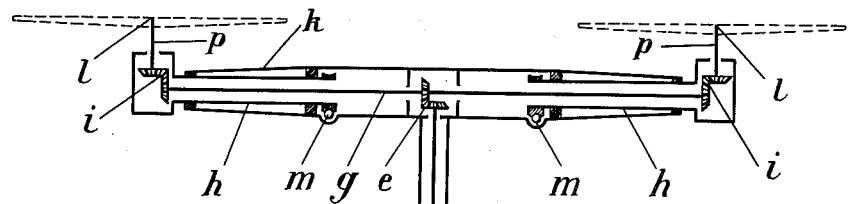
Fig. 3a
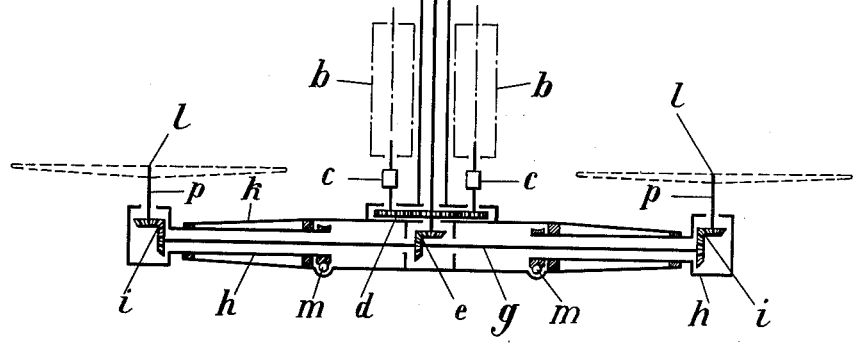
Fig. 3b
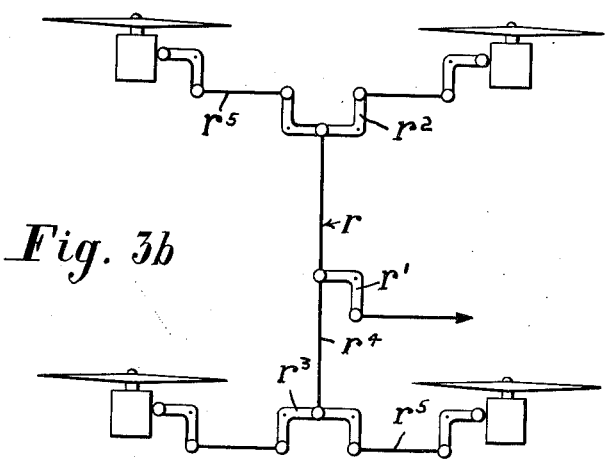
GIORGIO STEFANUTTI
INVENTOR.
BY Wenderoth, Lind & Ponack
ATTORNEYS

United States Patent Office 3,037,721
Patented June 5, 1962

3,037,721
VERTICAL TAKE OFF AND LANDING
AIRCRAFT
Sergio Stefanutti, 33 Via Severano, Rome, Italy
Filed May 26, 1960, Ser. No. 31,965
Claims priority, application Italy June 1, 1959
2 Claims. (Cl. 244—7)

Many devices have been proposed concerning aircraft having the feature of vertically taking off and sustaining while stationary such as the helicopters, and of horizontally moving as the fixed wing aircraft.

In all these machines, which are embraced by the term "Convertoplane" a double lifting system is embodied:

An aerodynamic lifting power, which is supplied by a conventional wing in the horizontal movement step;

A static lifting power supplied by a propeller and engine unit, in the step of stationary or vertical flight.

All static lift devices proposed up to now, and serving the purpose of allowing flying machines to be embodied free from the speed limitations of the helicopters, have very remarkable disadvantages, which have prevented up to now any practical solution of this problem.

These disadvantages are of various nature: complexity and delicateness of the system, low efficiency of the lifting power, difficulty of the control and equilibrium and mainly difficulty of manoeuvre in the conversion stage from the stationary flight to the horizontal flight, and to a greater extent in the return stage from the horizontal flight to the stationary flight.

The present invention aims to embody a device for the static lift and traction and by the utilization of said device the most common defects of the convertoplanes are substantially removed.

In this device the static lift, instead of being supplied by one or more rotors located along a cross-wise axis as in the present convertoplanes, is supplied by four propellers located in the four quadrants defined by the cross unit consisting of the fuselage and the wings.

The axes of these propellers pass through the apexes of the quadrilateral figure having two sides perpendicular to the vertical plane of the aircraft containing the longitudinal fuselage axis, and symmetrical with respect to this plane. The arrangement of the four propellers is such that the resultant of the four lifting actions passes through the center of gravity of the aircraft.

The four propellers are mechanically driven by a single prime mover, so that their rotational speeds are in constant relationship; however the lifting action of the propellers can be different due to a different pitch of the blades, or a different diameter of the propellers, or to both these reasons simultaneously. The driving shafts of the propellers can be caused to pivot in a vertical plane parallel to the symmetry plane of the aircraft, through a 180° angle. In the fore horizontal position the propellers supply only a tractive action, in the vertical position said propellers supply only a lifting action and in the rear horizontal position, said propellers supply only a braking action.

In the first sector, from the fore horizontal to vertical lines, the propellers supply simultaneously a tractive action and a lifting action; in the second sector from the vertical to rear horizontal lines said propellers supply simultaneously a lifting action and a braking action.

The pivotal movements of the four shafts are timed so that their inclination is always identical.

In the attached drawings having an exemplary value with no limitative intent are shown some characteristic features of this invention.

FIGURES 1a and 1b show in plan view and in side elevation, respectively, a convertoplane according to the present invention hovering and in vertical flight (climb and descent);

FIGURES 2a and 2b show in plan view and in side elevation, respectively, the same convertoplane with the propellers being tilted to a vertical cruising position;

FIG. 3a shows a diagrammatic view of the propelling and lifting unit;

FIG. 3b is a diagrammatic view of the means for differential variation of propeller pitch; and FIGURES 4a, 4b and 4c show maneuver diagrams for the machine in the stages of conversion from the static lift to aerodynamic lift and vice versa.

Referring now to the drawings, FIG. 1a shows the directions of rotation for the four propellers, which rotate in opposite directions, that is to say the two side propellers on each side rotate in opposite directions and the front and back propellers on opposite sides of the fuselage rotate in opposite directions, so that there is no compensation necessary for the torque or gyroscopic effect (aerodynamic dissimetry of the propeller lifting effect in the conversion stage).

Referring now to the FIG. 3 of the drawings, the propelling and lifting unit comprises a supporting framework $a$ for the entire unit, engines $b$ (in the illustrated case the engines are two in number located side by side with the framework), the engines being carried preferably directly by the said framework. Free wheeling couplings $c$ connect the said engines to the unit allowing the unit to operate even with only a single engine in operation. Gear means $d$ couple the output shafts of the said free wheel couplings $c$ with a central shaft $f$, first bevel gears $e$ on the ends of shaft $f$ transmitting the movement through transverse shafts $g$ to second bevel gears $i$ which in turn transmit the rotation to lift and traction propellers $l$. The said propellers are supported by cross-arms $k$ containing hub-carrying hollow shafts $h$, which are operable by worms $m$ through a 180° angle for controlling the tilting of propeller shafts $p$. The pitch of the propeller blades can be changed by the means $r$, which may be any conventional pitch changing device, e.g. that shown in U.S. Patent 2,928,476 dated March 15, 1960. A simplified version of such a pitch changing device is shown in FIG. 3b, in which cranks $r^1$, $r^2$ and $r^3$ are connected by a series of links $r^4$ and $r^5$ and to the propeller mechanism per se such that pivoting of the crank $r^1$ in the direction indicated by the arrow causes simultaneous variation of the pitch of the propellers.

As to the FIGS. 4a, 4b and 4c, the radial segments denote the variation of power, the circular sectors show the change of inclination of the propeller shafts. FIG. 4a shows the maneuver during the take-off stage and the subsequent conversion to horizontal flight. The maneuver is carried out by adjustment of the inclination of the propeller shafts by worms $m$. First the propeller shafts $p$ are in vertical position (plane of the propellers in horizontal position). The power of the engines $b$ is quickly carried to a maximum (portion 0–1) causing the machine to take-off. Subsequently the propeller shafts $p$ are pivoted forwardly to produce a thrust component tending to accelerate the aircraft horizontally.

As the speed increases, a wing lift is created which contributing to the unitary lifting action allows the inclination of the shafts to be gradually decreased until said shafts have been carried to their horizontal position (portion 1–2), as soon as the minimum speed for the aerodynamic lift has been reached.

Subsequently the speed will be reduced (portion 2–5) down to the value desired for the cruising flight, which can be performed also by a single operating engine.

FIG. 4–b shows the manoeuvre for the conversion of the horizontal flight into the stationary flight, for the subsequent landing, by a slow deceleration technique.

After the engines have been carried to the minimum output and the aircraft has been carried to gliding flight conditions, the propeller shafts are pivoted through an angle of about 120°; then the engine speed is very gradually increased in order to create a braking action together with a lifting action to integrate the wing lift which becomes more and more insufficient, due to the slowing down of the horizontal translational speed (portion 0–1).

When the full power has been reached, the shafts are gradually carried to their vertical position, and said position will be reached when the horizontal movement will have been entirely annulled.

This manoeuvre is called "by power adjustment" because it is mainly developed by adjustment of the thrust.

FIG. 4–c shows the same stage of flight, however carried out by another technique, i.e. "by adjustment of the inclination of the shafts."

According to this technique the pivotal movement of the axes instead of being limited to 120° is prosecuted to 180°. Subsequently, the power is quickly carried to its maximum value causing then the shafts to pivot in reverse direction as the speed slows down, so as to balance at any instant the portion of the weight which is no more supported by the wing.

The aircraft control, in the stationary or vertical flight stages is obtained as follows:

Longitudinal control: by a differential operation of the pitch between the two pairs of front and rear propellers (increase of the pitch of the front propellers for climbing and reverse contrary actuation for down pitching).

Lateral control: by differential manoeuvre of the pitch between two pairs of right and left hand propellers respectively.

Directional control: by lateral deflection of the exhaust gas from the turbines.

The control of the aircraft in the quick flight stage is of the conventional type for any type of aircraft. The two control systems, i.e. the one system for control during hovering or vertical flight and the other for control during normal flight, are harmonically coupled on the same control members at disposal of the pilot (control stick and rudder bar), so that said systems integrate in their action throughout the stage of intermediate flight and the self-sufficient aerodynamic lift flight.

During the quick flight stage the control devices for the stationary flight will be uncoupled from the actuating members, so that the latter will act only on the conventional control members of the aircraft.

With respect to the convertoplanes characterized by the propellers having their shafts rigid with the wing plane, and which request therefore, for changing their inclination, the rotation of the entire wing plane, the convertoplane according to this invention presents the following specific advantages:

(a) The excess of lift with respect to the weight as requested by the practical possibility of the vertical flight and the conversion to the horizontal flight may range in a remarkably lower range (10% instead of 30%).

(b) The particular flight stages required by the conversion in the above convertoplanes (a curve path having a large radius for passing from the vertical flight to the horizontal flight in the taking off stage; climbing to vertical and subsequent stop for the vertical descent in the landing stage) are totally eliminated: the aircraft is capable of standing still in air, of advancing at any speed ranging from zero to the maximum flight speed; of rearwards moving at low speed exactly as a helicopter.

More generally, with respect to all types of convertoplanes heretofore proposed, the convertoplane according to this invention has the further advantages as follow:

(c) extreme simplicity of its manoeuvre, due to the simplicity of the operation of the machines in all flight conditions and to the attitude being always controlled by the pilot through the same control members.

(d) a great lift efficiency with limited diameters of the single propellers, since the total of the covered discs corresponding to that of a single rotor having a double diameter, acts in a totally wake free zone (in the convertoplanes having the rotor with a stationary wing the disc is severely chocked by the wing, fuselage and underlying control planes).

(e) Capacity of being adapted to the amplest centering variations since a slight difference in the pitch of the two pairs of front and rear propellers allows a large excursion of the center of gravity.

(f) Removal of all intricate systems for the control and equilibrium necessary in case of single rotor or of propellers axially aligned with the wing, for neutralizing the gyroscopic effects, the torque action and the variation of the center of gravity (such as the tail airscrews and the like).

In fact in case of four propellers, the revolution directions of which are opposite two by two, no torque or gyroscopic effect to be neutralized subsist; as to the longitudinal and lateral manoeuvre it is carried out by a simple differential action on the propellers pitch.

(g) Removal of any speed limitation of the translation speed with respect to the conventional propeller aircraft.

(h) Reduction to an acceptable limit of the risks associated to the failure of an engine during the static lift stage.

In fact in the most unfavourable case of the power subdivided on only two engines, the failure of an engine carries to a limited reduction of lift, due to the increased covered disc/power ratio, to slightly more than 30%. This causes in the landing stages, when the machine has already discharged most of its fuel, the portion of the non balanced weight to be generally little and such to allow a quick return to the aerodynamic lift flight.

The lift and tractive device as in the illustrated example can consist of a unit structurally independent from the wing unit so that it can be manufactured by specialized engine-manufacturers and then forwarded to the aeronautical industry for mounting onto different wing unit embodiments.

I claim:

1. A vertical take-off and landing aircraft adapted for hovering and forward flight comprising a fuselage and wings at substantially right angles to said fuselage, a propelling and lifting unit including a framework on said aircraft and supporting the entire unit, two cross-arms supported by said framework, a central drive shaft extending longitudinally through said framework, two transverse shafts extending through said cross-arms, four propulsion and lifting propellers, one in each of the four quadrants defined by the perpendicular fuselage and wings, propeller shafts carrying said propellers, engines carried by said framework for operating the said unit, free wheel couplings connected to said engines, gear means operatively connecting said free wheel couplings to said central drive shaft, first bevel gears on said central drive shaft and said transverse drive shafts operatively connecting said central drive shaft to said transverse shafts, second bevel gears on said transverse shafts and propeller shafts operatively connecting said transverse shafts to said propeller shafts, hollow shafts enclosing said transverse shafts and rotatably mounted in said cross-arms, worms engaged with said hollow shafts for pivoting said hollow shafts through a 180° angle to control the tilting of propeller shafts, the bevel gears being connected for driving the propellers in adjacent quadrants in opposite directions and in diametrically opposite quadrants in the same direction, and driving all propellers at equal speeds, whereby said propellers are adapted to perform traction, lifting and braking functions, whereby the aerodynamic dissymmetry of the propeller lifting effect in the conversion stage is balanced.

2. A vertical take-off and landing aircraft adapted for hovering and forward flight comprising a fuselage and wings at substantially right angles to said fuselage, a propelling and lifting unit including a framework on said aircraft and supporting the entire unit, two cross-arms supported by said framework, a central drive shaft extending longitudinally through said framework, two transverse shafts extending through said cross-arms, four propulsion and lifting propellers, one in each of the four quadrants defined by the perpendicular fuselage and wings, propeller shafts carrying said propellers, engines carried by said framework for operating the said unit, free wheel couplings connected to said engines, gear means operatively connecting said free wheel couplings to said central drive shaft, first bevel gears on said central drive shaft and said transverse drive shafts operatively connecting said central drive shaft to said transverse shafts, second bevel gears on said transverse shafts and propeller shafts operatively connecting said transverse shafts to said propeller shafts, hollow shafts enclosing said transverse shafts and rotatably mounted in said cross-arms, worms engaged with said hollow shafts for pivoting said hollow shafts through a 180° angle to control the tilting of propeller shafts, the bevel gears being connected for driving the propellers in adjacent quadrants in opposite directions and in diametrically opposite quadrants in the same direction, and driving all propellers at equal speeds, and means connected to said propellers for differential variation of the propeller pitch, whereby said propellers are adapted to perform traction, lifting and braking functions, whereby the aerodynamic dissymmetry of the propeller lifting effect in the conversion stage is balanced.

References Cited in the file of this patent

UNITED STATES PATENTS

| | | |
|---|---|---|
| 1,414,314 | Star | Apr. 25, 1922 |
| 2,423,625 | Smith | July 8, 1947 |

FOREIGN PATENTS

| | | |
|---|---|---|
| 666,491 | Great Britain | Feb. 13, 1952 |